United States Patent [19]
Van Camp et al.

[11] Patent Number: 5,907,993
[45] Date of Patent: Jun. 1, 1999

[54] SATELLITE BREWING SYSTEM

[76] Inventors: Ray Van Camp, 2729 Corning Ct., Reno, Nev. 89523; Eugene R. Kief, Jr., 3395 Lookout Pl., Reno, Nev. 89503

[21] Appl. No.: 08/923,517

[22] Filed: Sep. 4, 1997

[51] Int. Cl.[6] ................................................ A47J 31/00
[52] U.S. Cl. .................................. 99/280; 99/299; 99/305
[58] Field of Search ............................ 99/280, 282, 283, 99/299, 300, 304, 305, 306, 307

[56] References Cited

U.S. PATENT DOCUMENTS

| | | | |
|---|---|---|---|
| 4,064,795 | 12/1977 | Ackerman | 99/304 |
| 4,621,571 | 11/1986 | Roberts | 99/280 |
| 4,782,744 | 11/1988 | Bunn | 99/307 |
| 4,875,408 | 10/1989 | McGee | 99/307 X |
| 5,245,914 | 9/1993 | Vitous | 99/280 |
| 5,718,162 | 2/1998 | Hoover | 99/280 |

*Primary Examiner*—Reginald L. Alexander
*Attorney, Agent, or Firm*—Myers & Associates, Ltd.

[57] ABSTRACT

A beverage brewing system having a bypass conduit for brewing and dispensing a selected volume of a brewed beverage from a beverage brewing chamber to a container. The bypass conduit distributes hot water beneath the brewing chamber to mix with the brewed beverage being dispensed to maintain flavor at higher selected volumes. The container interconnects by a connector assembly and switch to deliver electrical power to a heater in the container. A remote docking station also interconnects with the receptacle to supply electrical power to the heater of the container. A spray head having outward diverging flow is mounted above the brewing chamber to deliver hot water thereto.

22 Claims, 12 Drawing Sheets

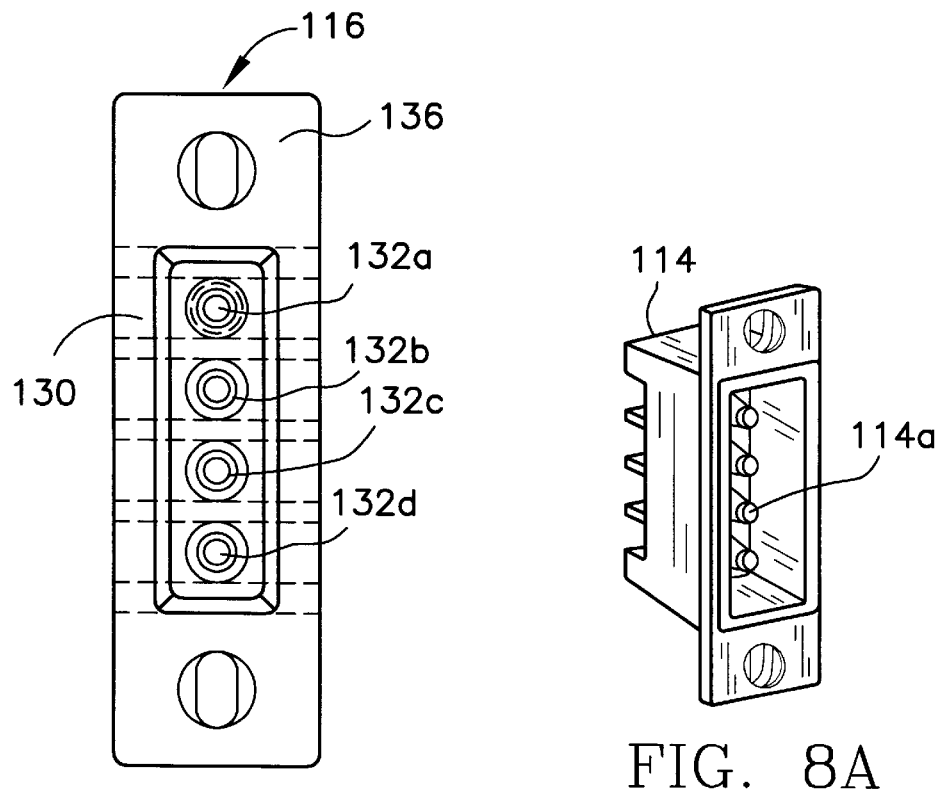
FIG. 8
FIG. 8A
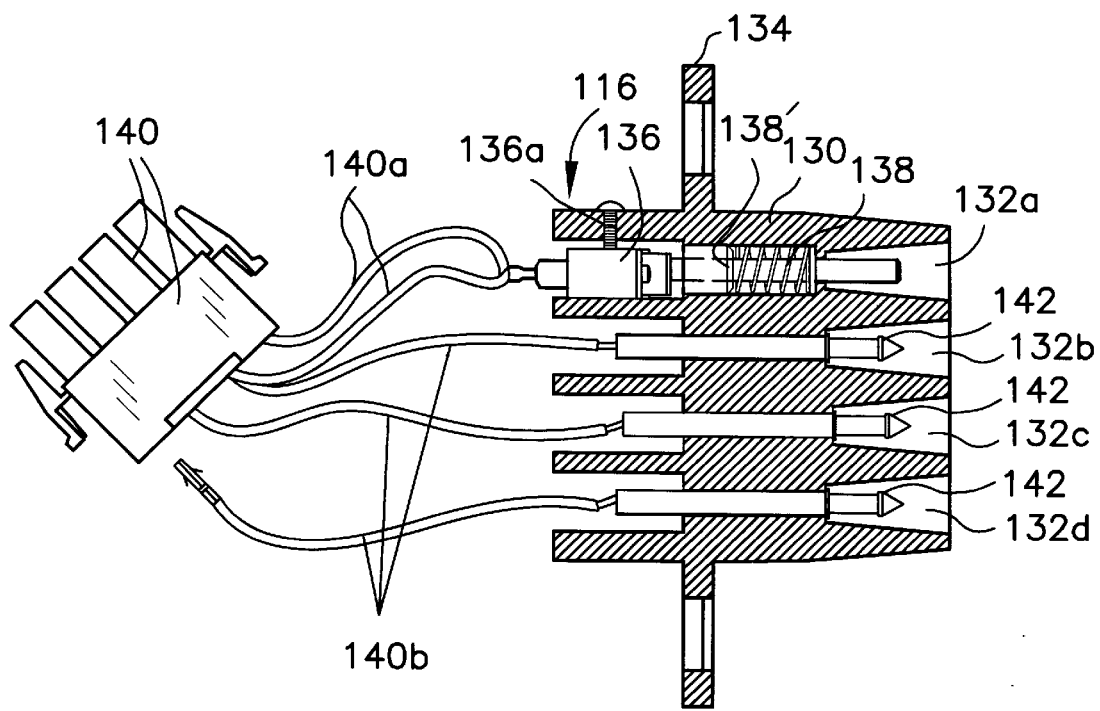
FIG. 9

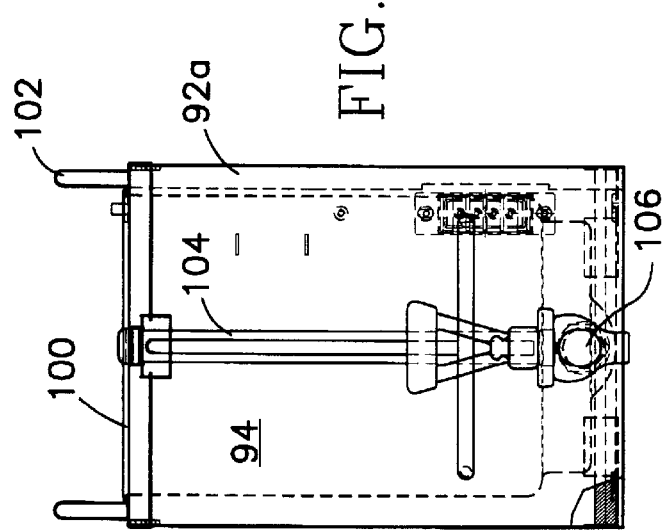
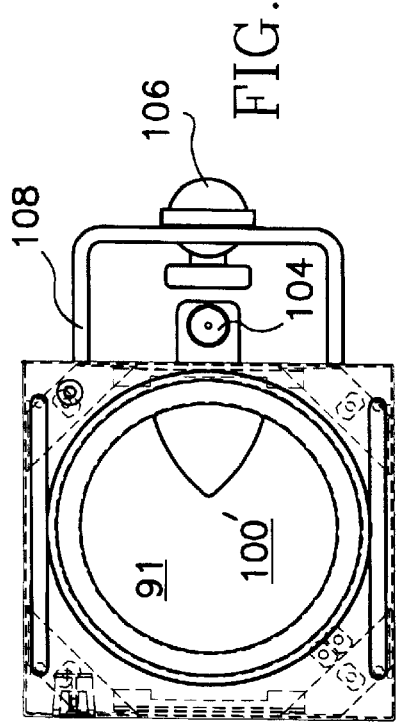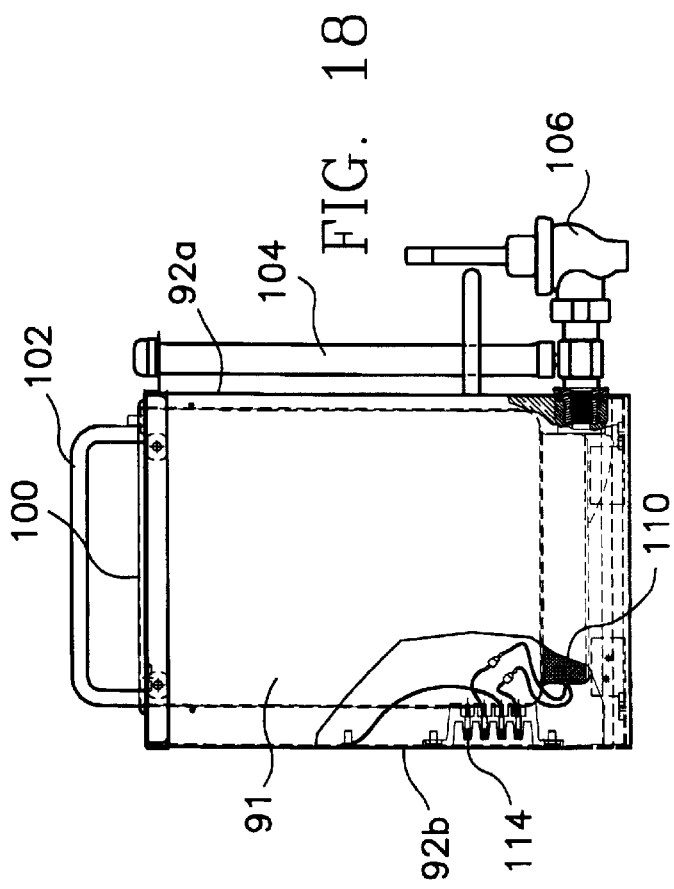

SATELLITE BREWING SYSTEM

BACKGROUND OF THE INVENTION

1. Field of the Invention

This invention relates in general to beverage brewing apparatus and, more particularly, to an improved beverage brewing system having satellite dispensing stations.

2. Description of the Prior Art

Beverage brewing systems, such as coffee brewers, are in widespread use. For reasons of time and convenience, it is desirable to provide coffee dispensing capabilities at a number of locations throughout an establishment or location. It is common to brew a beverage at one location in a dispensing container and transport the container to the various locations at which the coffee can be dispensed for consumption. Known equipment has not been wholly satisfactory in providing a wide range of operating characteristics to attain desired objectives of brewing tasteful coffee in portable decanters which are capable of maintaining palatability over an extended period of time. In addition, known brewers have not obtained an optimum separation of coffee during the brewing process to provide an uniform product without bitterness or other undesirable taste characteristics. Prior designs have particularly suffered from shortcomings in brewing a high quality coffee for a range of different desired volumes of beverage. Coffee quality in the prior art is also limited by the designs of known spray heads for delivering hot water into the brewing chamber. Further, known brewers have failed to provide an effective bypass flow to maintain uniform coffee quality, particularly at higher volumes. In many brewers and dispensing stations, exposed heated surfaces are present which may be injurious to individuals. Accordingly, the prior satellite type brewing systems have not incorporated a range of features to provide a high quality brewed product with safety and economy of design.

SUMMARY OF THE INVENTION

It is therefore an objective of this invention to provide an improved satellite brewing system for brewing flavorful coffee and the like. The coffee is brewed into a self-heated serving container which may be removed to a remote docking station of the invention at which the beverage may be dispensed. The satellite dispensing container of the invention includes an internal heating means so that the coffee brewer and docking station do not require exposed heating elements which potentially could be injurious to an individual. In addition, the temperature of the coffee is maintained in the container without being heated to extend coffee quality for longer periods. The satellite dispenser container means herein disclosed is provided with a unique receptacle assembly (FIG. 8a) that engages connectors (FIGS. 8 and 9) having a switch of either the coffee brewer apparatus or the remote docking station. When the brewed coffee container is interconnected with the coffee brewer, a circuit is completed to permit the brewing cycle to commence. When the coffee container is interconnected with the docking station or the brewer, the interconnection with the micro switch connector assembly supplies power to the heater of the container to maintain the temperature of the contents.

The improved coffee maker of the invention includes solenoid flow valves by which different volumes of coffee can be brewed for any given operating cycle as needed. As an example, the coffee brewer of the invention can be selectively controlled to brew one half gallon, one gallon, one and a half gallons or more of coffee, or other selected volumes as applications demand. To insure a quality coffee product, particularly at the higher volume level, the coffee brewer of the application includes a hot water bypass that is situated outside of the brewing container and delivers a selective amount of hot water into the coffee dispenser container to maintain a proper coffee concentration. The coffee brewer of the application further includes an improved spray head by which the spray of hot water into the coffee within the coffee brewing chamber is delivered in a gentler more outwardly diverting pattern for better coffee quality. The improved spray head of the invention insures better separation of coffee for uniform extraction without bitterness as found in some prior spray head designs. The brewer and docking station of the invention further includes a quality timer light to indicate that contents should be replaced with a fresh beverage.

BRIEF DESCRIPTION OF THE DRAWINGS

FIG. 8 is a front elevational view of connector assembly of the invention;

FIG. 8a is a front perspective view, with parts removed, of the receptacle of the satellite container of the invention;

FIG. 9 is a side elevational view, with parts in section, of the connector assembly of FIG. 8;

FIG. 17 is a top plan view of the satellite dispensing container of the invention;

FIG. 18 is a side elevational view of the satellite dispensing container of FIG. 17;

FIG. 19 is a front elevational view of the satellite dispensing container of FIG. 17;

DESCRIPTION OF PREFERRED EMBODIMENT

Figure 1:
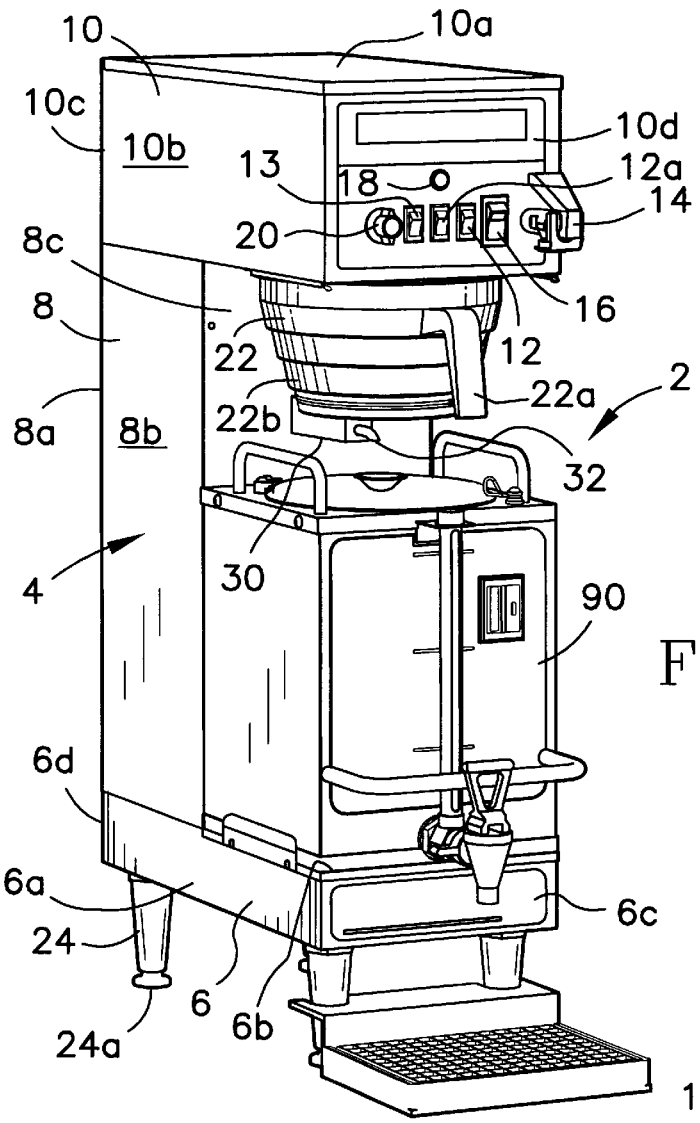
FIG. 1 is a front perspective view of the satellite brewing system of the invention.

Referring to FIGS. 1, 3, 4, 5a and 21, there is illustrated the exterior of the satellite brewing system of the invention, generally designated by reference numeral 2. The satellite brewing system 2 is formed from a hollow housing 4 fabricated from stainless steel, aluminum or other metal material. The housing 4 includes a base 6 comprising opposed side walls 6a, exposed front panel 6c and back panel 6d. The exposed front portion 6b forms a base upon which a satellite beverage dispensing container to be described may be positioned. A heater tank housing 8 is positioned rearwardly of the coffee satellite brewing system 2 and is attached to base 6 by suitable mechanical connecting means (not shown). The intermediate tank housing 8 includes a back panel 8a, a pair of opposed side panels 8b and a front panel 8c which is disposed in a vertical plane rearwardly of upper surface 6b. An upper housing 10 is affixed to the top of housing 8 and includes top panel 10a, a pair of opposed side panels 10b, rear panel 10c and front control panel 10d. The front control panel 10d supports exterior control elements including stop brew switch 12, start brew switch 12a and satellite indicator light 13. The control panel 10d further supports an exterior hot water faucet 14 for dispensing hot water without the brewing process as is conventional. A master tank heater switch 16 is mounted on panel 10d to actuate the tank heater of the invention for heating water. In addition, an indicator light 18 is provided on the front panel 10d to indicate that the hot water is sufficiently hot for a brewing cycle. A three-position volume control switch 50 is mounted on the front panel 10d adjacent to the satellite indicator light 13 and is selectively moveable to choose a different volume of beverage to be brewed, such as, example, ½ gallon, 1 gallon, and 1½ gallons. The selector switch 20 is rotatable to the selected position for the particular volume of coffee to be brewed.

Figure 3:
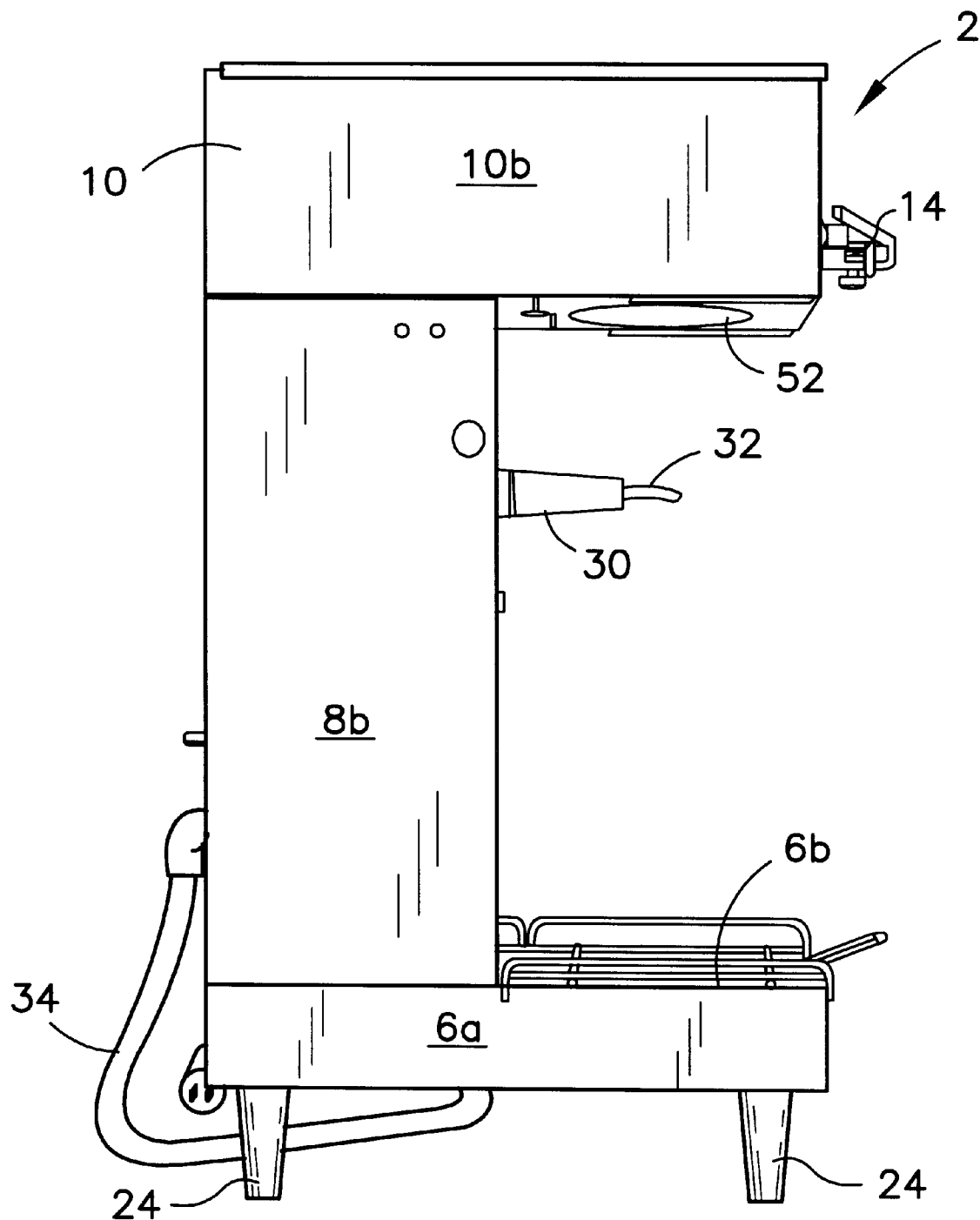
FIG. 3 is a side elevational view, with parts removed, of the satellite brewing system of FIG. 1.
Figure 4:
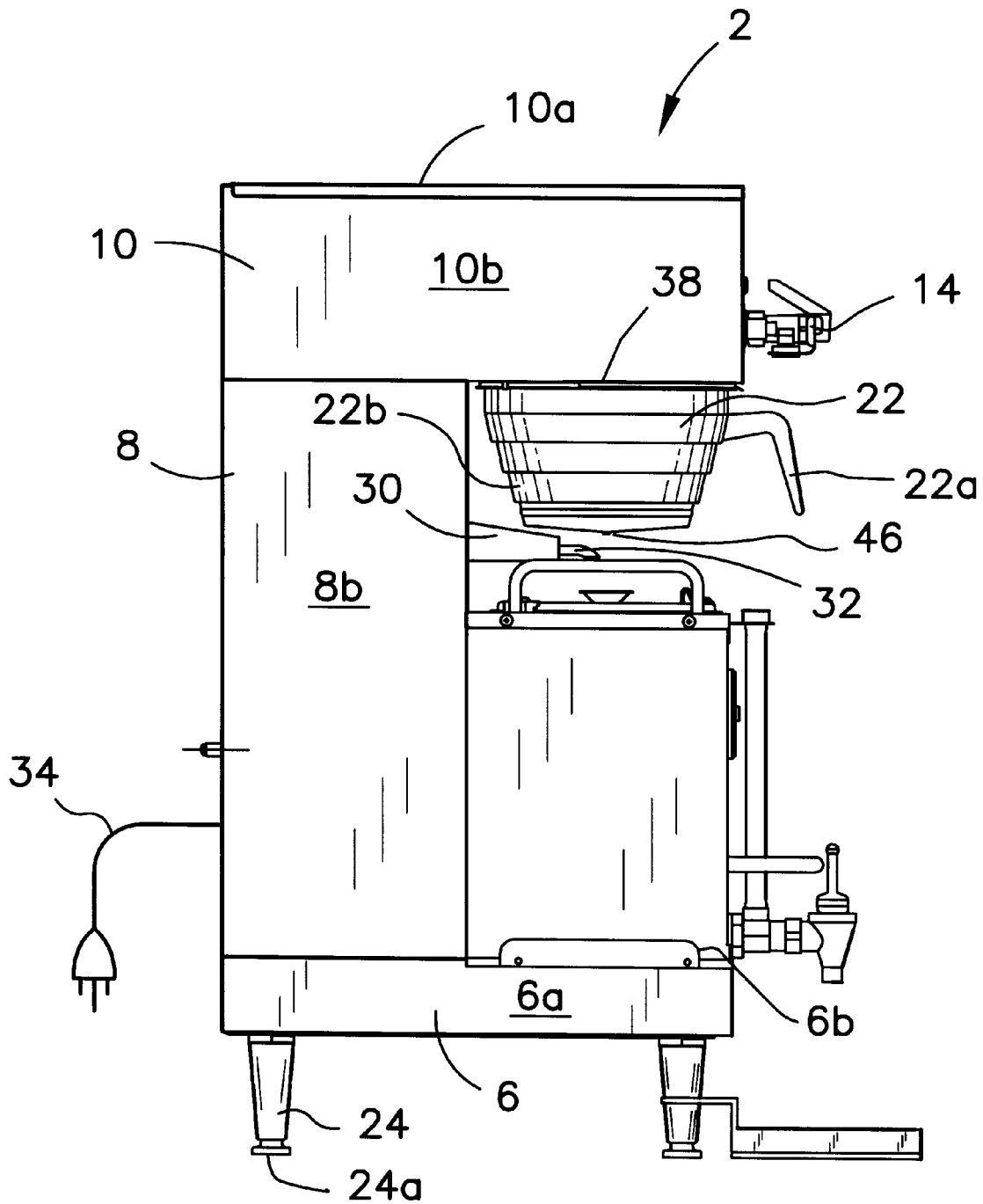
FIG. 4 is a side elevational view of the satellite brewing system of FIG. 3 with the satellite dispensing container in position to receive the brewed beverage.

As is apparent in FIGS. 1, 3 and 4, the top housing 10 overhangs over the intermediate tank housing 8 above the top surface 6b and supports a removable brewing chamber 22 having a handle 22a and inwardly sloped stepped circumferentially extending body portions 22b. Further details of the brewing chamber will described later. The lower base 6 is supported on four legs 24 having rubber tips 24a to prevent slippage of the coffee brewing system when in position and to protect any surface upon which the brewing system is mounted. As is further shown in FIGS. 1, 3 and 4, a hot water bypass line housing 30 extends outwardly from front panel 8c and is disposed beneath the brewing chamber 22 to inject hot water from nozzle 32 into the stream of brewed coffee flowing down from the brewing chamber, a feature advantageous for brewing higher volumes of a beverage, such when switch 20 is set at an 1½ gallon volume. As seen in FIGS. 3 and 4, the coffee brewing system 2 includes a power cord 34 for connection to a power source of suitable voltage.

Figure 6:
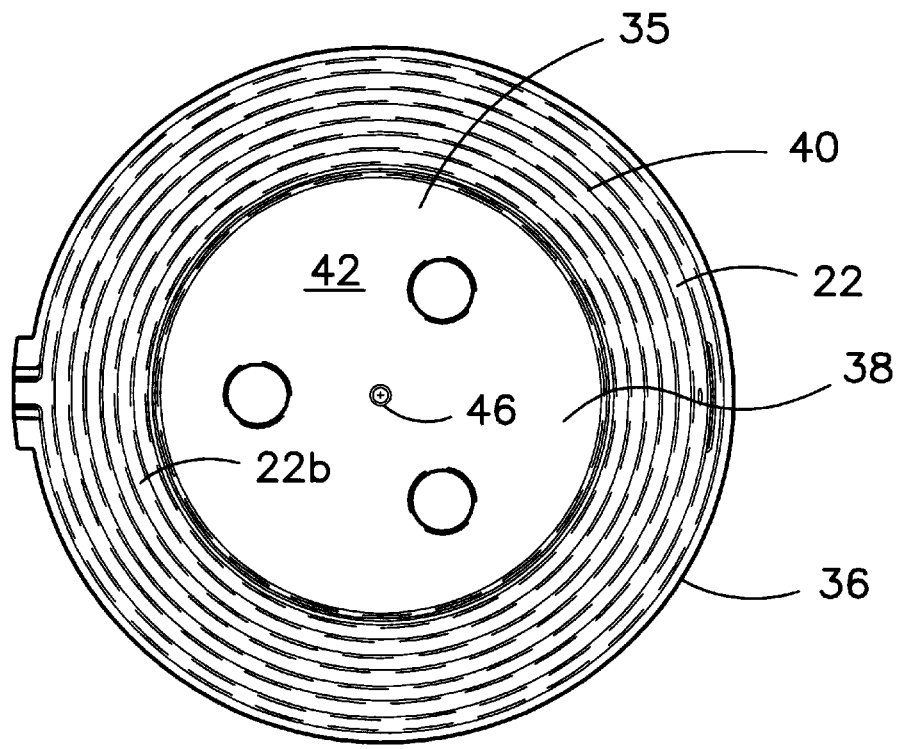
FIG. 6 is a top plan view of the brewing chamber of the satellite brewing system of FIG. 1.
Figure 7:
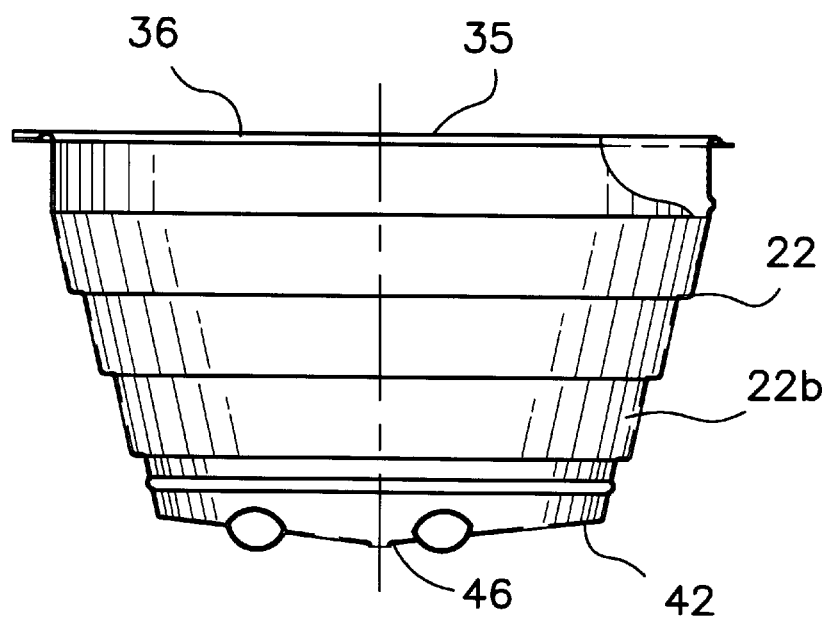
FIG. 7 is a front elevational view of the brewing chamber of FIG. 6.
Figure 12:
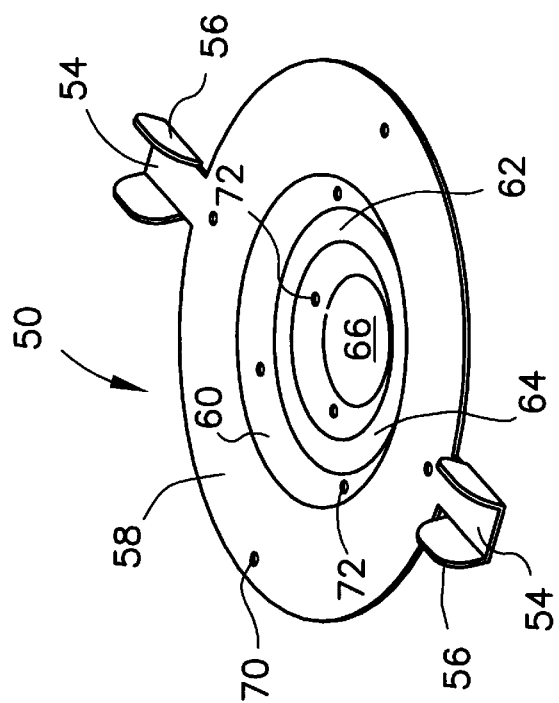
FIG. 12 is a top perspective view of the spray head of FIG. 10.
Figure 10:
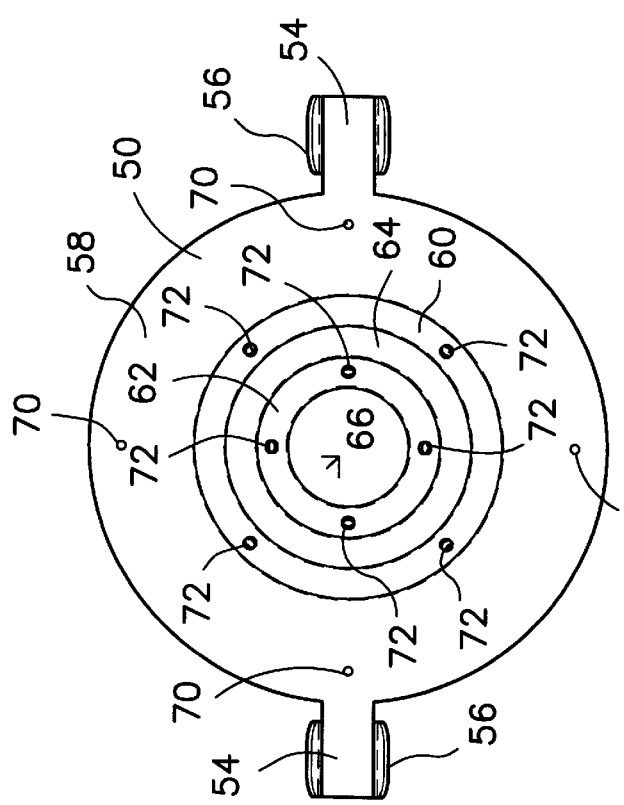
FIG. 10 is a bottom plan view of the improved spray head of the brewing system of FIG. 1.
Figure 11:
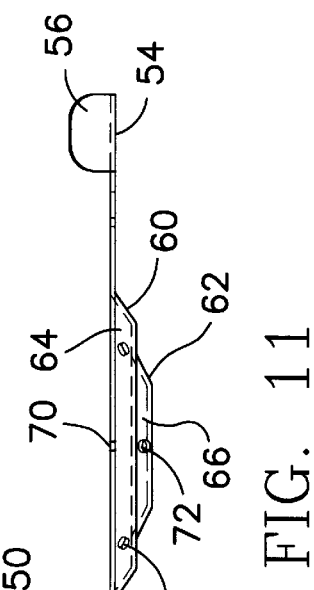
FIG. 11 is a side elevational view of the spray head of FIG. 10.

Referring now to FIGS. 4, 6 and 7, details of the brewing chamber or basket 22 are best shown. The brewing chamber or basket 22 is preferably formed from a metal having an open top 35 defined by circumferentially extending rim 36 and progressively smaller circumferentially extending sections 22b which form a brewing chamber 38. The brewing chamber 38 is adapted to receive a standard filter (not shown) and an optional metal support rack (not shown) which supports the dry coffee grounds or other beverage to undergo the brewing process. The bottom 42 of the brewing chamber 35 is inwardly sloped to terminate with a central brewed beverage discharge opening 46. Because of the bypass feature, brewing chamber 35 may be smaller than conventional chambers.

The hot water is delivered from the hot water tank (to be described) through the novel sprayer head 50 of the invention as best shown in FIGS. 10, 11, 12 and 13. The sprayer head 50 is secured to retention portion and outlet 52 at the bottom of upper housing 10 of the satellite brewing system 2 as seen in FIG. 3. The sprayer head 50 includes a pair of outward projections 54 having wing elements 56 to secure the sprayer head to the portion 52 of the satellite brewing system in a conventional manner. The sprayer head 54 possesses a generally circular, cross-sectional configuration formed by base 58 and downwardly projecting sloped portions 60 and 62 which are separated by flat, circular ring portion 64. The lowermost portion 66 of sprayer head 50 is formed as a flat bottom central area. A plurality of orifices 70, such as four in number, are provided through outer base section 58. A plurality of orifices 72, such as four in number, are further provided through both sloped sections 60 and 62. From the foregoing, it should be apparent that the orifices 70 produce a downward plurality of sprays while the other orifices 72 of the slope portions 60 and 62 generate an outward spray. The controlled expanding pattern of flow provides a gentler spray for better coffee extraction without bitterness or a chalky taste.

Figure 2:
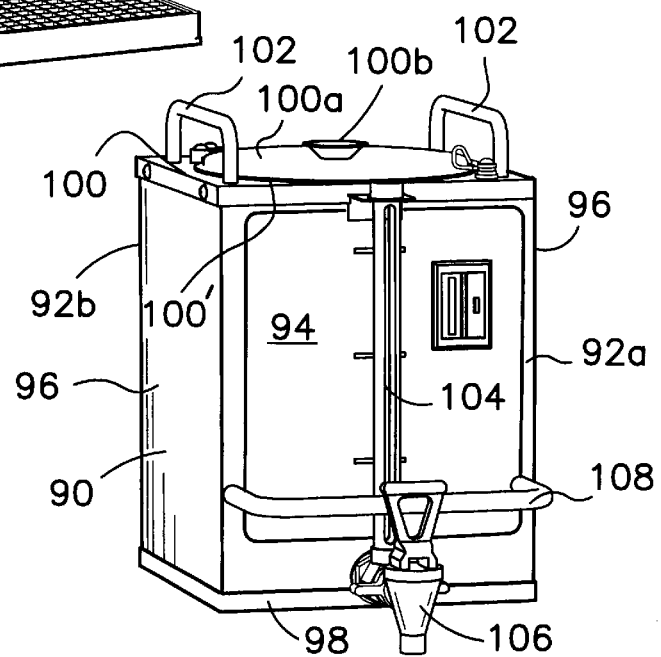
FIG. 2 is a front perspective view of the satellite coffee dispenser of the invention.

Referring now to FIGS. 2, 17, 18 and 19, the satellite dispensing container 90 of the invention is best shown. The satellite dispensing container 90 is formed by interconnected front and back rectangular metal panels 92a and 92b and identical opposed rectangular metal side panels 96. The satellite brewing container 90 has a bottom rectangular panel 98 and a top portion 100 having an opening 100' for receiving a lid 100a removably attachable to the container 90 as is conventional. The container 90 includes a brewed beverage receiving chamber 91 from which the coffee can be dispensed by the user. The coffee is delivered into the container 90 from the brewed beverage orifice 46 provided in the brewing chamber 22 of satellite brewing system 2 through an upper funnel 100b provided in the removable lid 100a (FIG. 2). The satellite dispensing container 90 may readily be transported from place to place by handles 102 suitably affixed to the roof portion 100. A conventional sight tube 104 is mounted on the front surface 94 in fluid communication with the chamber 91 to provide a visual indication of the volume of brewed beverage remaining in the container 90. The user may dispense coffee through a conventional nozzle 106 mounted at a lower portion of the satellite container 90. A horizontal handle 108 is affixed to the front panel 94 at a lower position to also aid in manipulating the satellite dispensing container 90 and to prevent nozzle handle movement during transport. The satellite dispensing container 90 includes an internal electric circuit (not shown) having a heater 110 for maintaining the temperature of the coffee over an extended period. The heater may be a silicone heater 110 which is capable of keeping the coffee warm for extended periods such as up to five hours.

Figure 20:
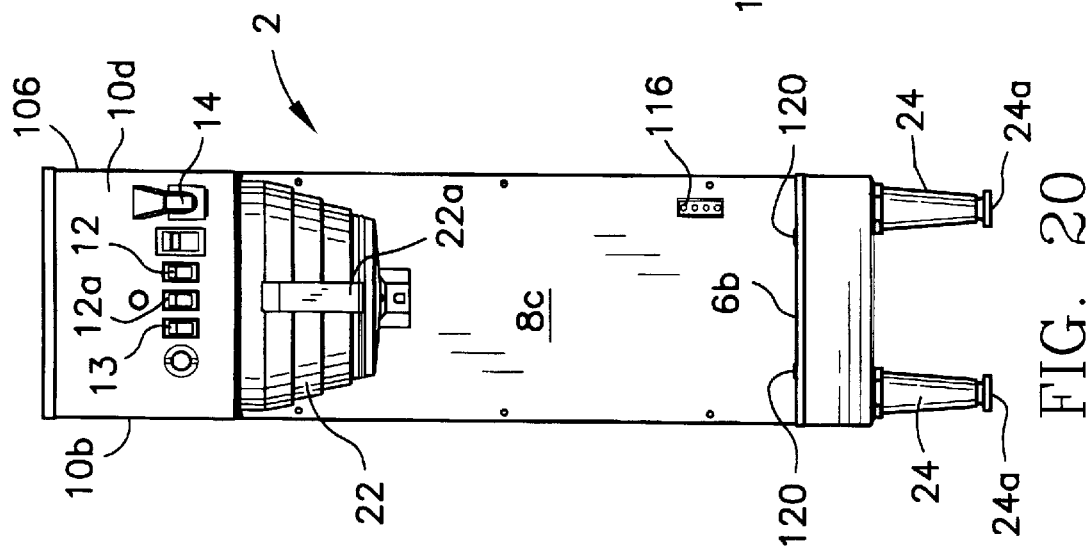
FIG. 20 is a front elevational view of the satellite brewing system of FIG. 1.

As shown in FIGS. 8, 8a, 9, 17 and 18, a unique receptacle 114 (FIG. 8a) is mounted on the rear wall 92b to interconnect with a four pin connector assembly 116 (FIGS. 8 and 9) provided on the front wall 8c of the satellite brewing system 2 (FIG. 20), such that the connection between receptacle 114 (FIG. 8a) and connector assembly 116 (FIGS. 8 and 9)

provides electric power from the internal circuit (to be described) of the satellite brewing system 2 to the heater 110 within the satellite dispensing container 90 to maintain the temperature of the brewed beverage at a desired level. The light 13 will be illuminated upon a proper connection between receptacle 114 (FIG. 8a) and connector assembly 116 (FIGS. 8 and 9). The electrical connection between the receptacle 114 (FIG. 8a) and pin connector assembly 116 (FIGS. 8 and 9) is maintained by use of indents 118 provided on the bottom wall 98 of container 90 which engage projections 120 (FIG. 21) on top surface 6b of the satellite brewing system 2. This engagement between container 90 and projections 120 also aids in safely securing the container to the satellite brewing system 2.

Referring now to FIGS. 8, 8a and 9, details of the receptacle 114 (FIG. 8a) provided on back wall 92b of the satellite dispensing container 90 are illustrated. The receptacle 114 includes four pins 114a. The receptacle 114 interconnects with connector assembly 116 provided on the satellite brewing system 2. The connector assembly 116 has a four pin female housing 130 of a plastic material forming four vertically aligned, pin passage openings 132a–d. Threaded studs are provided for mounting the receptacle 114 (FIG. 8a) within the satellite dispensing housing 90. The connector 116 includes pin opening 132a which is aligned with an internal snap-action switch 136 of a conventional design secured by screw 136a to the housing 130. A plunger 138 is operatively connected to the snap-action switch 136 and is resiliently biased outward by spring 138'.

When the plunger 138 is depressed by an inserted pin of receptacle 114 (FIG. 8a), the switch 136 will close and connect the circuits (not shown) of the satellite dispensing container 90 and the satellite brewing system 2 through connector 140 and leads 140a, 140b. The remaining openings 132b, 132c and 132d include spring pins 132, which when in contact with receptacle 114 (FIG. 8a), will connect the electrical potential of brewing system 2 to the heater circuit (not shown) of the heater 110. Thus, the heater 110 is only activated in accordance with a proper connection being made between the connector assembly 116 and the receptacle 114. The circuit of the satellite brewing system 2 includes a micro-switch that disables the brewing function of the system without a connection with dispensing container 90 being made.

Figure 5:
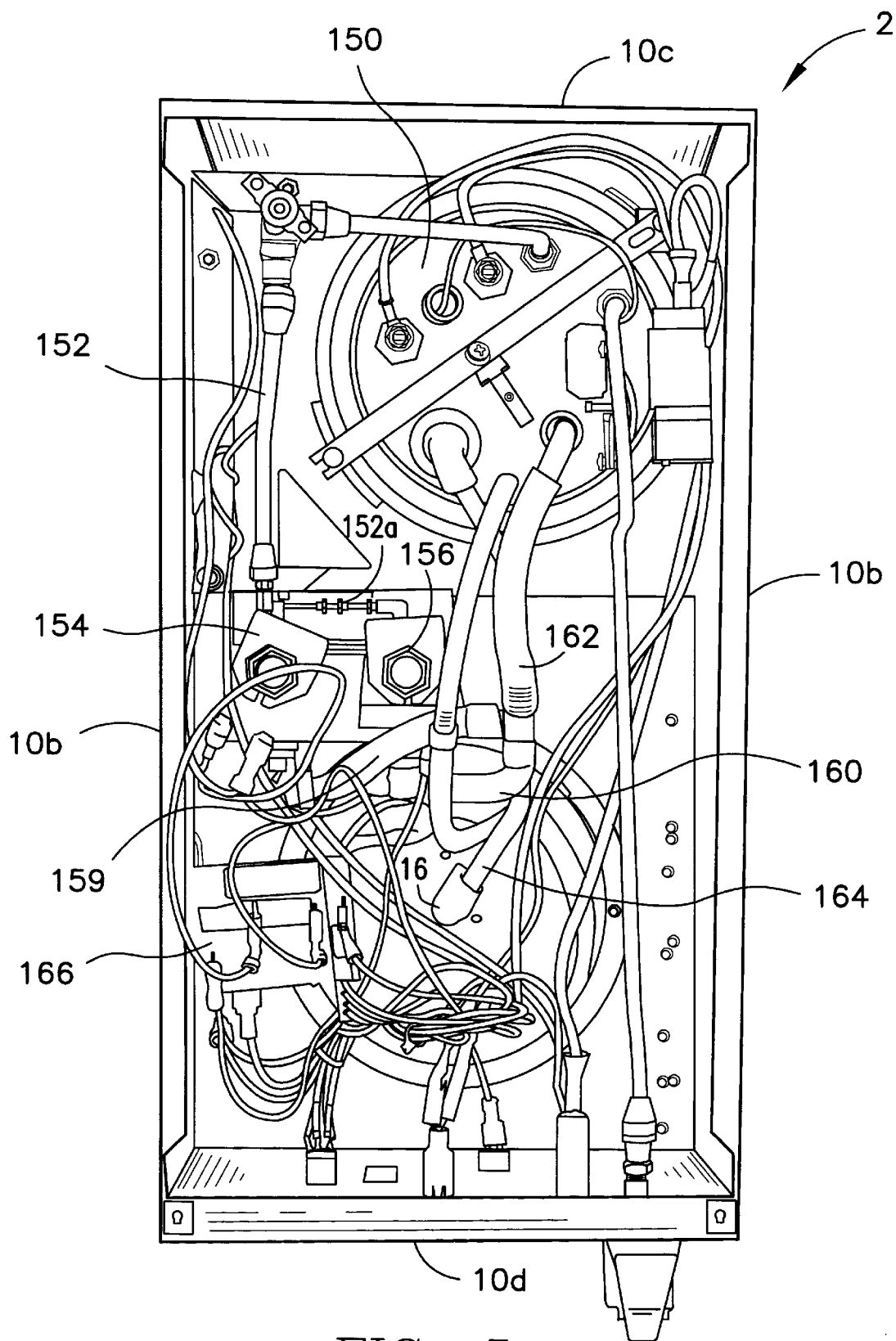
FIG. 5 is a top plan view, with parts removed, of the satellite brewing system of FIG. 1.
Figure 5A:
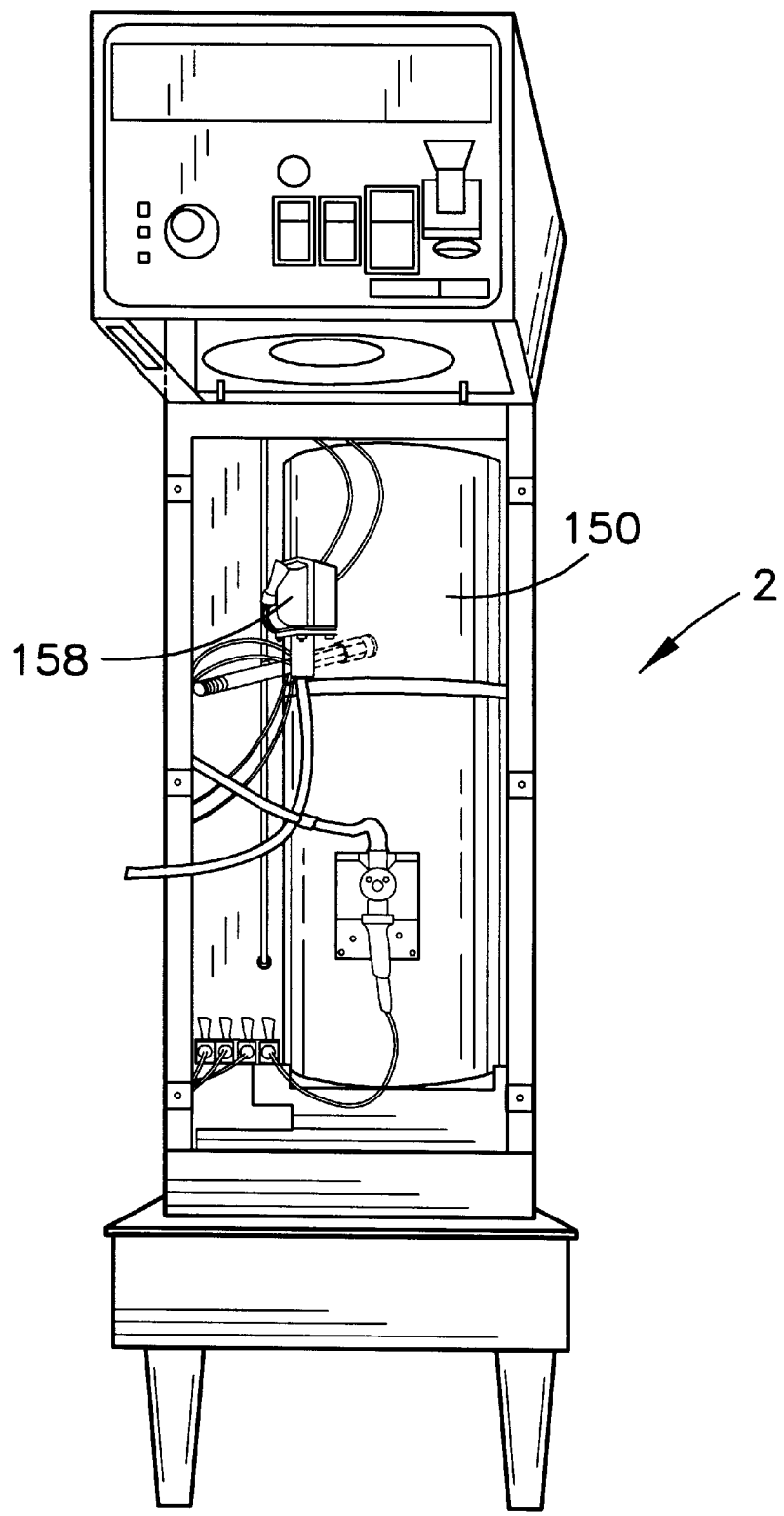
FIG. 5a is a front elevational view, with panels removed, of the satellite brewing system of FIG 1.
Figure 13:
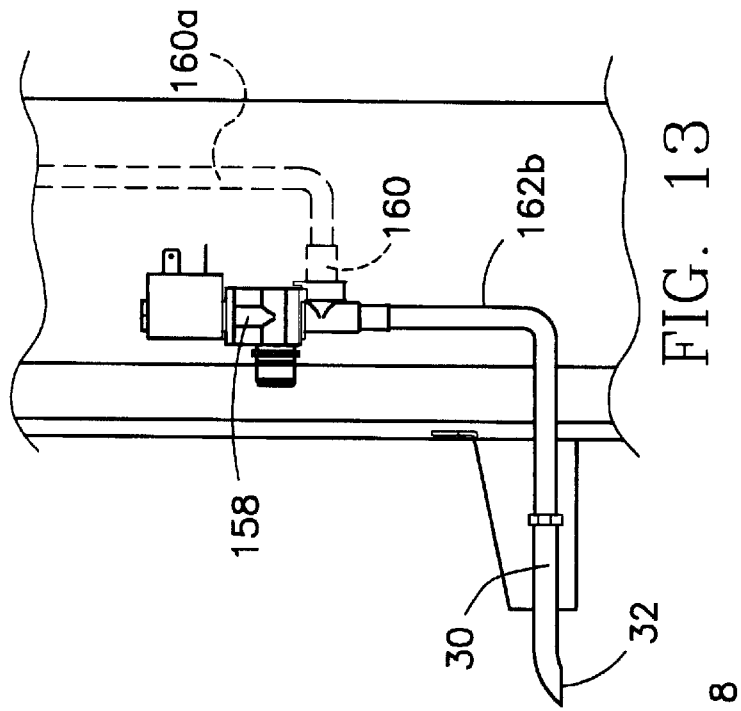
FIG. 13 is a side elevational view of the bypass water supply of the satellite brewing system of FIG. 1.
Figure 21:
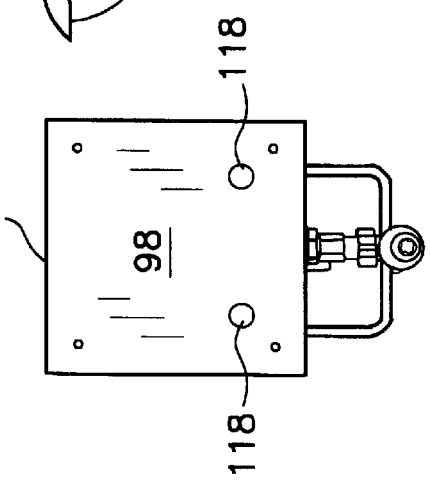
FIG. 21 is a bottom plan view of the satellite dispensing container of FIG. 2.
Figure 22:
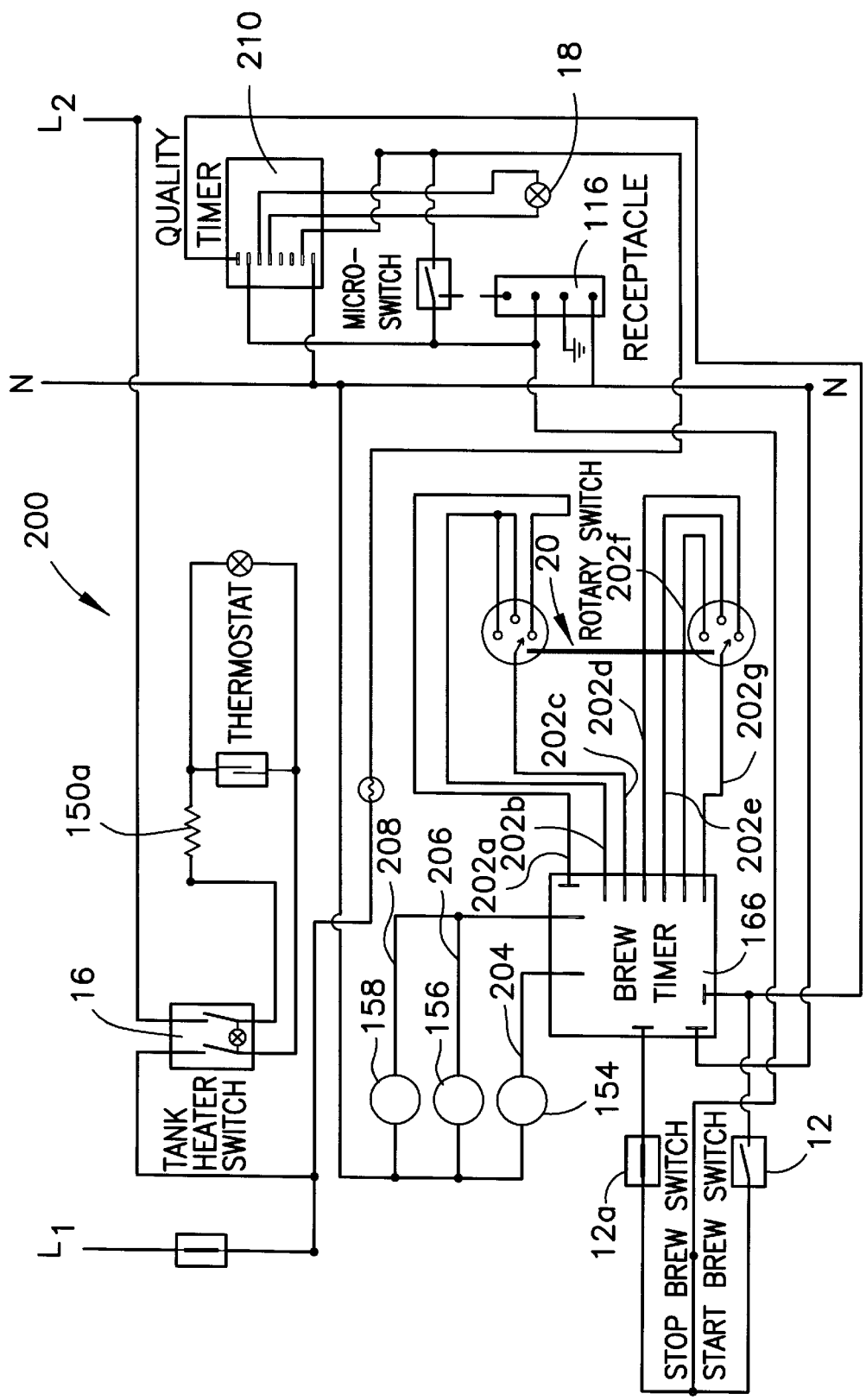
FIG. 22 is a schematic view of the electric circuit of the satellite brewing system of FIG. 1.

Referring now to FIGS. 5 and 5a, the interior of satellite brewing system 2 is illustrated. An upright cylindrical water heater tank 150' mounted to the rear of the housing includes a conventional heating element 150a (FIG. 22). A water inlet pipe 152 is connected through inlet piping (not shown) to a source of cold water. The inlet water pipe 152 is in fluid communication with solenoid flow valves 154 and 156 with solenoid flow valve 154 connected via branch inlet line 152a. As seen in FIGS. 5A and 13, a solenoid bypass valve 158 is mounted with an O-ring on tank 150 to deliver additional hot water in the manner to be described. Although other capacities may be used, the flow capacities of solenoid valve 154 and 156 may be, adjusted for proper extraction. The inlet water through inlet pipe 152 is controlled by solenoid valve 154 for a ½ or 1 gallon flow as selected by external volume control switch 20 (FIG. 1). The valve 156 is opened for brewing process when a 1½ to 1¾ gallon brew is selected by switch 20. In connection with brewing of 1½ gallons or more, the bypass valve 158 will also be opened. The flow from the solenoid valve 154 is directed through the conduit 152 into the conduit 162. Similarly, the water from the solenoid 156 flows through the conduit 160 into the conduit 162. The cold water in the conduit 162, whether from the solenoid valve 154 or the valve 156, then flows into the tank 150. The conduit 162 is connected to a pipe (not shown) to deliver the cold water to the bottom of the heater tank 150. A timer 166, which is connected by circuitry to switch 20, to the solenoid valves 154 and 156 and to the bypass valve 158, controls the time in which the respective valves are opened to deliver a given volume of cold water to the tank or deliver a flow of hot water from bypass valve 158.

As seen in FIGS. 5A and 13, the bypass valve 158 is exteriorly mounted in fluid communication with the interior of the water heater tank 150 to direct a bypass flow of hot water from the heat tank 150. The bypass valve 158 is connected to a conduit 160b having an open ended standpipe 160a disposed in tank 150 to provide a head to create a flow through the valve 158, when opened, to a conduit 162a mounted in housing 30 (FIG. 13). A bypass nozzle 32 mixes hot water from the tank 150 with coffee being brewed in brewing chamber 22 to provide a consistency of an extraction of coffee and improved taste for higher volumes, such as 1½ gallons.

In FIG. 22, the electrical control circuit 200 of the coffee satellite brewing system 2 includes a brew timer 166 electrically coupled to volume control switch 20 through seven electrical 202a–g and to solenoid flow valves 154 and 156 and bypass valve 158 through the leads 204, 206 and 208, respectively. Upon selection of a ½ or 1 gallon volume at switch 20, the solenoid valve 154 is open to direct cold water to the tank through conduit 162 which is connected internally to an elongated tank tube (not shown) to introduce cold water into the tank 150 at its bottom. The amount of cold water introduced into the tank 150 displaces hot water flow outwardly through tube 164 connected to an upper portion of the tank 150. The hot water is then directed through the spray head 50 and into the brewing chamber 22. The timer 166 is preselected to maintain the solenoid valve 154 open to obtain the selected volume desired. For example, the timer 166 may keep valve 154 open for 92 to 212 seconds for a ½ gallon brew and for 252 to 372 seconds for a 1 gallon brew or any other time duration dependent upon flow rate, volume and other parameters. As a further example, timer 166 maintains solenoid valve 156 having a higher flow rate and bypass valve 158 open for periods from 218 to 398 seconds. When the switch 20 is rotated to position to brew 1½ gallons or more as programed, both solenoid valve 156 and bypass valve 158 are opened whereby a portion of the volume of flow through solenoid valve 156 is displaced through the exit tube 162 and a portion flows through the bypass flow line 30 to mix with the hot brewed coffee and the like from the brewing chamber 22. The brew switch 12 is also connected to the timer 166 to initiate a timing sequence and a brewing cycle based on the volume selection of the switch 20. The timer 166 may be, for example, a commercially available cube/relay timer. The stop brew switch 12a is also connected to the timer 166 such that the brewing cycle may be ceased as required. The tank heater switch 16 is electrically connected to the tank heating element (not shown) to provide a supply of hot water within the tank. The indicator light 18 is illuminated if the heated water is at a proper temperature for the brewing process as determined by a thermal element (not shown) as is well known. A quality timer 210 is provided in operative connection to light 18 such that a flashing light indicates that fresh coffee needs to be brewed. The quality timer 210 may be set to indicate new coffee should be brewed.

Figure 16:
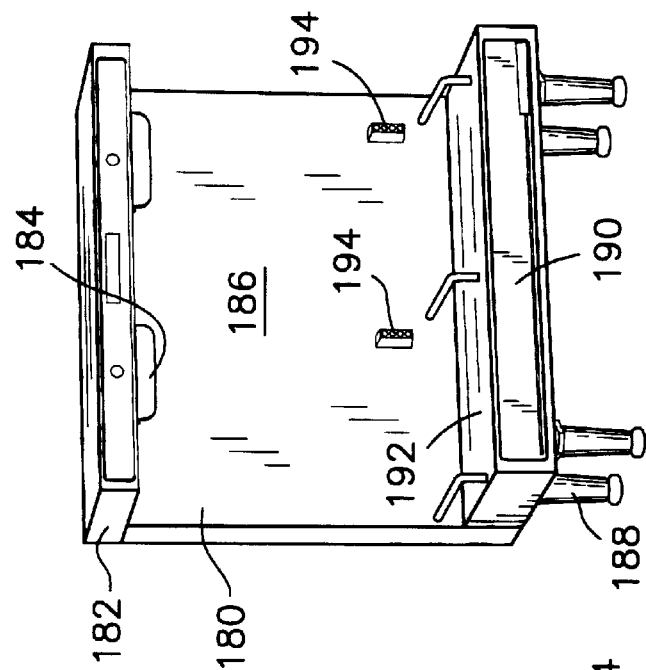
FIG. 16 is a front perspective view of the satellite docking station of FIG. 15.
Figure 15:
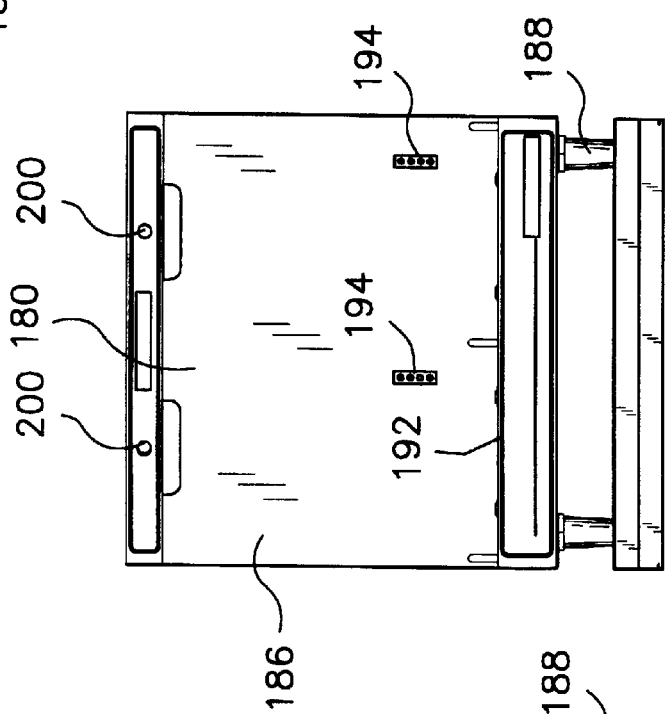
FIG. 15 is a front elevational view of the satellite docking station of FIG. 15.
Figure 14:
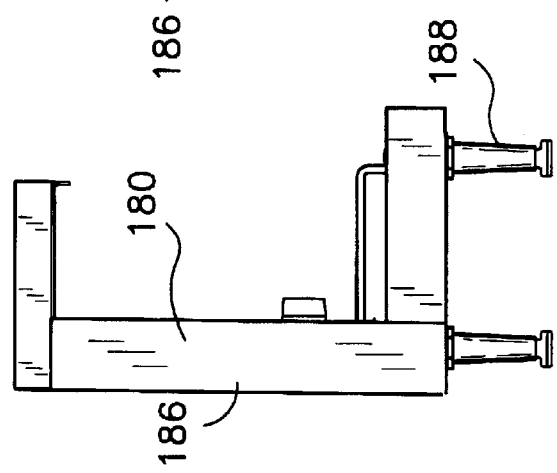
FIG. 14 is a side elevational view of the satellite docking station of the invention.

Referring now to FIGS. 14, 15 and 16, there is illustrated a dual docking station 180 at which a filled satellite dispensing container 90 can be positioned for dispensing coffee at a location removed from the satellite brewing system 2. The satellite docking station 180 includes an upper housing portion 182 having shields, an intermediate upright portion 186, legs 188 which support the upright portion 186 and a lower base 190. The base 190 includes an upper surface 192 upon which one or two satellite dispensing container 90 may be positioned. As seen adjacent horizontal surface 192, connector assembly 194 (FIGS. 8 and 9) is provided to engage the receptacle 130 (FIG. 8a) provided on the back of the satellite dispensing container 90. The satellite docking station is connected to a suitable external power supply and has circuitry in connection with connector assembly 194 (FIGS. 8 and 9), such that when the satellite dispensing container 90 is positioned in connected relationship, electrical power is supplied to the internal heating element 110 of the container 90 to maintain the coffee at proper temperature for extended periods of time. It should be noted that both the upper surface 6b of the satellite brewing system 2 and the surface 192 of the satellite docking station 192 do not include any heating elements to cause possible injury inasmuch as the satellite dispensing container 150 is internally heated. A pair of indicating lights 200 are provided on upper housing 182. As with the satellite brewing system 2, the lights 200 are coupled to an internal quality timer (not shown) to cause lights 200 to flash after an extended period of time to indicate new coffee must be introduced into the container 90.

What is claimed is:

1. A beverage brewing system having a bypass water outlet comprising housing means having tank means for heating liquid and a brewing chamber, said brewing chamber means having a beverage outlet to discharge a flow of beverage, supply means for supplying liquid to said tank means, means for delivering heated liquid from said tank means to said brewing chamber means, control means for selectively choosing the particular volume from a plurality of possible volumes of the heated liquid delivered to said brewing chamber means, and bypass means operatively coupled to said tank means and said control means for delivering an additional flow of a particular quantity of a plurality of different quantities of heated liquid from said tank means, said bypass means having a bypass outlet mounted beneath said beverage outlet to mix the additional flow with the flow of beverage, said bypass means delivering a first quantity of said heated liquid when said control means chooses a first particular volume of said heated liquid and a second quantity of said heated liquid when said control means chooses a second particular volume of said heated liquid, said first and second quantities constituting different relative fractions of said first and second volumes.

2. The beverage brewing system according to claim 1 wherein said control means includes means to deliver a plurality of different discrete volumes of the heated liquid from said tank means to said brewing chamber means.

3. The beverage brewing system according to claim 2 wherein said control means delivers the additional flow through said bypass means for at least one of said discrete volumes.

4. The beverage brewing system according to claim 3 wherein said bypass means includes valve means, said valve means being opened by said control means for at least one of said discrete volumes.

5. The beverage brewing system according to claim 3 wherein said control means delivers the additional flow through said bypass means for at least the largest of said discrete volumes.

6. The beverage brewing system according to claim 3 wherein said control means includes a plurality of solenoid valve means, each of said plurality of solenoid valve means being separately operatable for controlling delivery of said discrete volumes.

7. The beverage brewing system according to claim 6 wherein said plurality of solenoid valve means are operatively connected to said supply means.

8. The beverage brewing system according to claim 4 wherein said bypass means includes mounting means for supporting said valve means on said housing means, said mounting means including at least one O-ring.

9. A beverage brewing system having a bypass water outlet comprising housing means having tank means for heating liquid and a brewing chamber, said brewing chamber means having a beverage outlet to discharge a flow of beverage, supply means for supplying liquid to said tank means, means for delivering heated liquid from said tank means to said brewing chamber means, control means for selectively controlling the volume of the heated liquid delivered to said brewing chamber means, and bypass means operatively coupled to said tank means and said control means and including a standpipe mounted in said tank means, said bypass means being positioned at a lower vertical position relative to said standpipe, for delivering an additional flow of heated liquid from said tank means, said bypass means having a bypass outlet mounted beneath said beverage outlet to mix the additional flow with the flow of beverage.

10. The beverage brewing system according to claim 9 wherein said supply means includes a removable elongated open pipe extending through the top of said tank means downward to a position adjacent to the bottom of said tank means, said supply means delivering a volume of liquid to said tank means to displace said volume of heated from said tank means to said brewing chamber.

11. A beverage brewing system having a bypass water outlet comprising housing means having tank means for heating liquid and a brewing chamber, said brewing chamber means having a beverage outlet to discharge a flow of beverage, supply means for supplying liquid to said tank means, means for delivering heated liquid from said tank means to said brewing chamber means, control means for selectively controlling the volume of the heated liquid delivered to said brewing chamber means bypass means operatively coupled to said tank means and said control means for delivering an additional flow of heated liquid from said tank means, said bypass means having a bypass outlet mounted beneath said beverage outlet to mix the additional flow with the flow of beverage, container means for receiving the flow of beverage and the additional flow, said container means being arranged to be positioned below said beverage outlet and said bypass outlet, said control means being selectively connected to a source of electrical potential, and switch means for selectively applying electrical potential to said control means, said container means and said housing having complementary contact means, said contact means being connected when said container means is in position below said beverage outlet and said bypass means, said switch means being closed to apply electrical potential to said control means upon said contact means being connected, said container means including internal heater means and circuit means for connecting said heater means to said source of electrical potential upon said switch means being closed.

12. The beverage brewing system according to claim 11 wherein said housing means includes a flat support surface, said container means and said support surface having complimentary detent means to maintain said container means in position.

13. The beverage brewing system according to claim 11 wherein said switch means is supported on said container means.

14. The beverage brewing system according to claim 13 further including docking means separately positioned from said housing means, said docking means having circuit means connected to a source of electrical potential, said docking means and said container means having second complimentary contact means for closing said switch means and directing said source of electrical potential to said heater means.

15. A beverage brewing system having a bypass water outlet comprising housing means having a tank means for heating liquid and a brewing chamber means, said brewing chamber means having a beverage outlet to discharge a flow of beverage, supply means for supplying liquid to said tank means, means for delivering heated liquid from said tank means to said brewing chamber means, control means for selectively controlling the volume of the heated liquid delivered to said brewing chamber means, container means for receiving the flow of beverage, said container means being arranged to be positioned below said beverage outlet, said control means being selectively connected to a source of electrical potential, and switch means, coupled to said control means, for selectively applying electrical potential to said control means, said container means and said housing having complimentary electrical contact means, said contact means being electrically connected when said container means is in position below said beverage outlet, said switch means being closed to apply electrical potential to said control means upon said contact means being electrically connected.

16. The beverage brewing system according to claim 15 wherein said container means includes internal heater means, circuit means for connecting said heater means to said source of electrical potential upon said switch means being closed.

17. The beverage brewing system according to claim 16 wherein said switch means is supported on said housing means.

18. The beverage brewing system according to claim 17 further including docking means separately positioned from said housing means, said docking means having circuit means including second switch means connected to a source of electrical potential, said docking means and said container means having complimentary contact means for closing said second switch means and directing said source of electrical potential to said heater means.

19. The beverage brewing system according to claim 15 wherein said complimentary contact means includes a first connector means mounted on said container means and a second connector means mounted on said housing means adjacent said container means in position beneath said beverage outlet, said second connector means including said switch means, said first connector means and said second connector means being connectable upon said container means being positioned beneath said beverage outlet to close said switch means.

20. The beverage brewing system according to claim 19 wherein said second connector means includes a housing having a plurality of openings, each of said openings having a pin connector, one of said plurality of said pin connectors being operatively connected to said switch means.

21. The beverage brewing system according to claim 20 wherein the other said plurality of pin connectors being connected to said heater means to apply electrical potential thereto.

22. The beverage brewing system according to claim 19 wherein said switch means is a switch.

* * * * *